Feb. 10, 1970   D. GERSTENBERG ET AL   3,494,021
HAFNIUM FILM CAPACITOR AND METHOD FOR FABRICATION THEREOF
Filed Feb. 26, 1968

INVENTORS D. GERSTENBERG
F.T.J. SMITH

BY
ATTORNEY

United States Patent Office 3,494,021
Patented Feb. 10, 1970

3,494,021
HAFNIUM FILM CAPACITOR AND METHOD FOR FABRICATION THEREOF
Dieter Gerstenberg, Morristown, N.J., and Frank T. J. Smith, Bedford, Mass., assignors to Bell Telephone Laboratories, Incorporated, Murray Hill and Berkeley Heights, N.J., a corporation of New York
Filed Feb. 26, 1968, Ser. No. 708,339
Int. Cl. H01g 13/00
U.S. Cl. 29—570       4 Claims

ABSTRACT OF THE DISCLOSURE

Hafnium film capacitors are prepared by reactively sputtering hafnium dioxide upon an aluminum electrode, subjecting the resultant assembly to electrolytic anodization and depositing a counter electrode thereon.

---

This invention relates to a technque for the fabrication of thin film capacitors including a layer of aluminum as one of the electrodes, hafnium dioxide as the dielectric, and an electrically conductive counterelectrode and to the resultant capacitors.

In recent years there has been widespread interest in the electronics industry in a class of capacitors commonly referred to as printed capacitors. These structures are typically constructed by depositing a layer of a film-forming metal upon a substrate, anodizing the deposited layer to form an oxide film and finally depositing a counterelectrode upon the anodized film. The resultant devices are found to be polar in nature and when initially produced represented the first such device in which a semiconductive layer of manganese dioxide was eliminated, such having been a requirement in solid electrolytic capacitors produced theretofore.

At that juncture in the chronological history of capacitor development, it was believed that the printed capacitor represented the ultimate objective in the development of capacitors employing an electrode comprising a film-forming metal. Although this type of capacitor is eminently suited for use in printed circuitry, its importance in this use has resulted in a continuing effort to improve it. Accordingly, workers in the art have long sought to enhance the electrical characteristics of such devices.

In accordance with the present invention, a technique is described for the fabrication of a thin film capacitor evidencing superior dielectric strength, humidity sensitivity, and dissipation factor, as compared with prior art structures. The inventive technique involves reactively sputtering a hafnium dioxide dielectric upon an aluminum electrode and subjecting the resultant assembly to electrolytic anodization.

The invention will be more readily understood by reference to the following detailed description taken in conjunction with the accompanying drawing, wherein.

Figure 1:
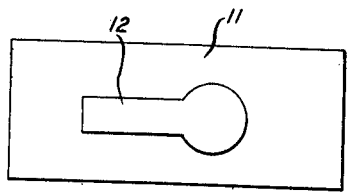
FIG. 1 is a plan view of a substrate with a pattern of aluminum deposited thereon.

With further reference now to FIG. 1, there is shown a substrate 11 having a pattern of aluminum 12 deposited thereon. The inventive technique contemplates the use of a substrate material which is able to withstand temperatures to which they may be subjected during the deposition stages of the processing. Glasses and glazed ceramics are particularly suitable in this use.

Initially, the substrate member is cleansed by conventional techniques well known to those skilled in the art. Following the cleaning step, a layer of aluminum 12 is deposited by conventional condensation techniques, as, for example, vacuum evaporation, cathodic sputtering, and so forth, as described by L. Holland in "Vacuum Deposition in Thin Films," J. Wiley & Sons, 1956. From a theoretical standpoint, an anodizable metal such as tantalum, hafnium, niobium, and so forth, should be suitable for use in the described structure. However, it has been determined that the electrical characteristics of these materials are subject to degradation after deposition thereon of reactively sputtered hafnium dioxide, such being attributed to the tendency of oxygen to diffuse from the hafnium dioxide film into the underlying metal anode layer during the reactive sputtering stage, thereby resulting in an oxygen deficient hafnium dioxide dielectric. Therefore, aluminum is chosen as the anodizable metal since no diffusion of oxygen is found to occur during the deposition stage.

For the purposes of the present invention, the thickness of the aluminum anode ranges from 1000–10,000 A. The use of aluminum layers thinner than 1000 A. fails to result in fabrication of an operative device whereas layers appreciably beyond 10,000 A. in thickness adversely affect device properties due to mechanical instability.

Following the deposition of the aluminum anode, the assembly is placed in a sputtering apparatus including a hafnium cathode or an aluminum disk covered with hafnium, for example, in the form of a foil. The apparatus is next evacuated and oxygen is admitted at a dynamic pressure and, after attaining equilibrium, argon is admitted. The extent of the vacuum is dependent upon consideration of several factors.

Increasing the inert gas pressure and thereby reducing the vacuum within the vacuum chamber increases the rate at which the hafnium being sputtered is removed from the cathode and, accordingly, increases the rate of deposition. The maximum pressure is usually dictated by power supply limitations since increasing the pressure also increases the current flow between the cathode and the anode in the sputtering chamber. A practical upper limit in this respect is 20 microns of mercury for a sputtering voltage of 3000 volts, although it may be varied depending on the size of the cathode, sputtering rate, and so forth. The ultimate maximum pressure is that at which the sputtering can be reasonably controlled within the prescribed tolerances. It follows from the discussion above that the minimum pressure is determined by employing the lowest deposition rate which can be economically tolerated.

After the requisite pressure is attained, the cathode which may be composed of hafnium or, alternatively, an aluminum disk covered with hafnium is made electrically negative with respect to the anode.

The minimum voltage necessary to produce sputtering is about 3000 volts. Increasing the potential difference between the anode and cathode has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations in the discharge are well known and have been given names as, for example, Crooke's Dark Space. For the best efficiency during the sputtering step, the substrate should be positioned immediately without Crooke's Dark Space on the side closest to the anode. Location of the substrate closer to the cathode results in a metal deposit of poorer quality. Locating the substrate further from the cathode results in impingement on the substrate by a smaller fraction of the total metal sputtered, thereby increasing the time necessary to produce a deposit of given thickness.

It should be noted that the location of Crooke's Dark Space changes with variations in the pressure, it moving closer to the cathode with increasing pressure. As the substrate is moved closer to the cathode, it tends to act as an obstacle in the path of gas ions bombarding the cathode. Accordingly, the pressure should be maintained sufficiently low so that Crooke's Dark Space is located beyond the point at which a substrate would cause shielding of a cathode. The balancing of these various factors of voltage, pressure and relative positions of the cathode and of the substrate to obtain a high quality deposit is well known in the sputtering art.

Figure 2:
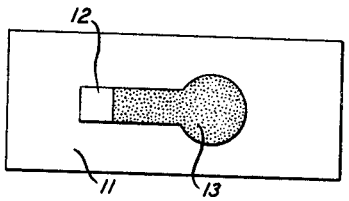
FIG. 2 is a plan view of the body of FIG. 1 after deposition thereon of a reactively sputtered layer of hafnium dioxide.

By employing a proper voltage, pressure, and spacing of the elements within the vacuum chamber, a layer of hafnium dioxide 13 (FIG. 2) is deposited in a configuration defined by a sputtering mask which conforms to the configuration of the aluminum layer. Sputtering is conducted at oxygen partial pressures within the range of $10^{-5}$–$10^{-3}$ torr for a period of time calculated to produce the desired thickness.

Figure 2A:
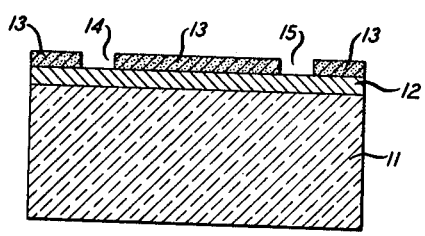
FIG. 2A is a cross-sectional view of the body of FIG. 2 showing pinhole defects in the hafnium dioxide layer.
Figure 3:
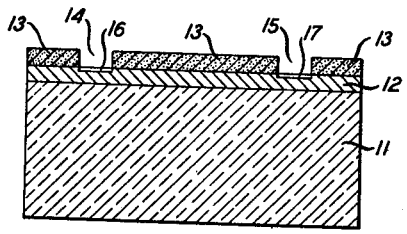
FIG. 3 is a cross-sectional view of the body of FIG. 2A after electrolytic anodization.

With reference now to FIG. 2A, there is shown a cross-sectional view of the body of FIG. 1 after the deposition thereon of the reactively sputtered layer of hafnium dioxide 13. Pinhole defects 14 and 15 in the hafnium dioxide layer 13 adversely affect the dielectric properties of layer 13 and dictate a further anodization procedure whereby the aluminum layer 12 underlying the hafnium dioxide layer will be oxidized at the sites of the pinholes. Anodization is effected in an appropriate electrolyte. The voltage at which the anodizing is conducted is primarily determined by the thickness of the hafnium dioxide layer. The usual procedure to be followed in effecting the anodization procedure is similar to conventional anodizing processes in which a low voltage is applied initially, and the voltage is then increased so as to maintain a constant anodizing current. Examples of low conductivity electrolytes suitable for this purpose are aqueous solutions of ammonium pentaborate, oxalic acid, citric acid, tartaric acid, and so forth. A cross-sectional view of the body of FIG. 2A after anodization is shown in FIG. 3. Shown in the figure are pinhole defects 14 and 15 including anodized aluminum layers 16 and 17 contained within the cavities of the defect areas 14 and 15.

Figure 4:
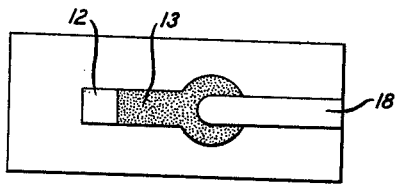
FIG. 4 is a plan view of the body of FIG. 3 after the deposition of a counterelectrode thereon.

The last step in the fabrication of a capacitor in accordance with the invention is the application of a counterelectrode in contact with the hafnium dioxide film. Any suitable method for producing an electrically conductive layer on the surface of the dioxide layer is suitably provided such method does not mechanically or thermally disturb the dioxide layer. Vacuum evaporation has been found to be especially suited for producing counterelectrodes in accordance with this invention, metals such as aluminum and gold being conveniently used in conjunction with this technique, the evaporated layer being restricted by means of a mask. FIG. 4 is a plan view of the body of FIG. 3 after the deposition thereon of a counterelectrode 16. Since the counterelectrode must conduct all of the current which passes through the capacitor, its electrical resistance is desirably low. The minimum thickness is approximately 500 A., a preferred range being from 1000–2000 A.

An example of the present invention is included merely to aid in the understanding of the invention. It will be understood that variations may be made by one skilled in the art without departing from the spirit and scope of the invention.

Example.—A glass plate approximately 1″ in width and 3″ in length was cleaned ultrasonically by conventional techniques. Thereafter, a layer of aluminum 5000 A. in thickness was deposited upon the substrate member by vacuum evaporation techniques. Next, the resultant assembly was placed in a sputtering apparatus including a hafnium cathode, the apparatus evacuated and oxygen admitted at a dynamic pressure. After obtaining equilibrium, argon, was admitted and sputtering effected by impressing a difference of potential of 4000 volts across the anode and cathode, the oxygen partial pressure in the system being maintained at approximately $2.0 \times 10^{-4}$ torr. Sputtering was conducted for 20 minutes, so resulting in the deposition of a hafnium dioxide layer 2000 A. in thickness upon the aluminum.

Next, anodization of the resultant assembly was effected electrolytically at 150 volts at a current density of 0.1 milliampere per square centimeter in an electrolyte comprising a 30 percent ammonium pentaborate solution in ethylene glycol. Anodization was conducted for 30 minutes. The capacitor was completed by the deposition thereon of a gold counterelectrode by vacuum deposition.

For comparative purposes, capacitors produced in accordance with the present invention were compared with anodized tantalum and hafnium capacitors and with reactively sputtered hafnium dioxide on aluminum capacitors (non-anodized). The anodized devices were prepared by cathodically sputtered tantalum or hafnium films 4000 A. in thickness upon a substrate member and anodizing and completing the structures as described above. The reactively sputtered hafnium dioxide films were produced as described herein but were not subjected to the anodizing treatment. The results of the comparison are set forth in the table below:

TABLE

| Property | Anodized tantalum | Anodized hafnium | Sputtered HFO$_2$ on Al | Sputtered and Anodized HFO$_2$ on A |
|---|---|---|---|---|
| Breakdown (a) Forward | 95–100 | 50–60 | 35–40 | 145–150 |
| Voltage (b) Reverse | 10–30 | 20–30 | 35–40 | 35–40 |
| Dissipation (a) at 1 kHz | 0.004 | 0.008–0.02 | 0.0015–0.002 | 0.001–0.0015 |
| Factor (b) at 100 kHz | 0.1–0.2 | 0.02–0.04 | 0.0015–0.004 | 0.001–0.004 |
| Change in capacitance on cycling from 0–87% relative huimdity (percent) | 2–3 | 15–25 | 1.3 | 0.8 |

It is noted by reference to the table that the devices prepared in the described manner manifest an improvement over the anodized tantalum and hafnium and the reactively sputtered hafnium dioxide on aluminum devices from the standpoint of breakdown voltage, particularly in the forward direction (an index of enhanced dielectric strength), moisture sensitivity and dissipation factors.

What is claimed is:

1. A method for the fabrication of a thin film capacitor comprising the steps of successively (a) depositing a layer of aluminum upon a substrate member by condensation techniques, (b) depositing a layer of hafnium dioxide upon said aluminum layer, (c) electrolytically anodizing the resultant assembly, and (d) depositing a counterelectrode upon and in intimated contact with said hafnium dioxide layer.

2. A method in accordance with claim 1 wherein said layer of hafinum dioxide is obtained by cathodic sputtering in the presence of oxygen maintained at a partial pressure within the range of $10^{-5}$–$10^{-3}$ torr.

3. A method in accordance with claim 1 wherein said assembly is anodized in an electrolyte comprising 30 percent ammonium pentaborate solution in ethylene glycol.

4. A method in accordance with claim 1 wherein said counterelectrode comprises gold.

References Cited

UNITED STATES PATENTS

| 2,883,390 | 4/1959 | Planer. | |
|---|---|---|---|
| 3,398,067 | 8/1968 | Raffalovich | 317—230 XR |
| 3,443,164 | 5/1969 | Hazzard | 29—570 XR |

JOHN F. CAMPBELL, Primary Examiner

U.S. Cl. X.R.

317—230, 258